Patented Feb. 14, 1950

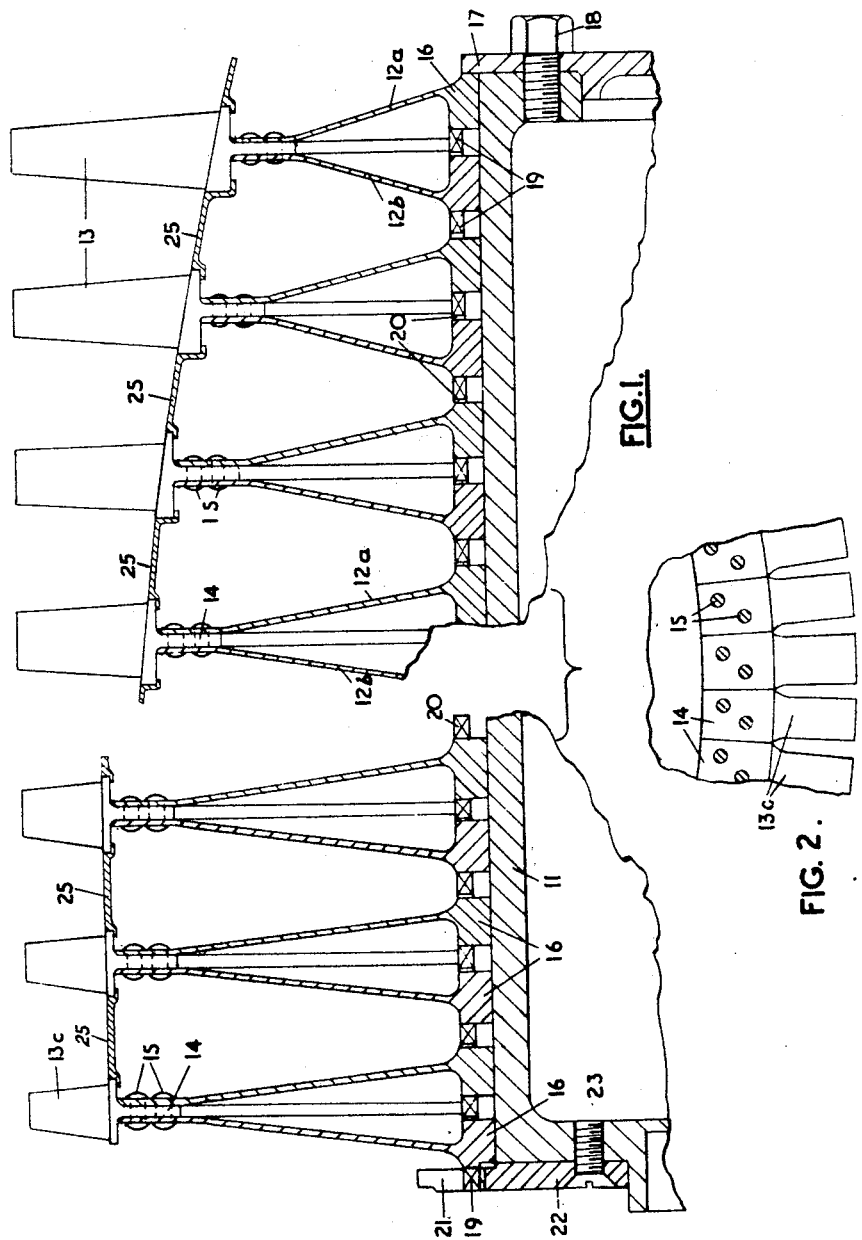

2,497,151

UNITED STATES PATENT OFFICE 2,497,151

MULTIDISK ROTOR

Thomas Clark and John Harry Clapham Atkins, Coventry, England, assignors to Armstrong Siddeley Motors Limited, Coventry, England Application November 13, 1946, Serial No. 709,644
In Great Britain March 4, 1946

3 Claims. (Cl. 230—134)

This invention relates to a rotor, carrying a number of circumferential blade rows, which is intended to operate with a relatively very high linear blade speed—as in the case of an axial-flow compressor for an internal-combustion turbine unit of relatively large diameter.

In the case of a relatively small compressor for an internal-combustion turbine unit, although the angular velocity may be very high the linear velocity of the blades is not so high as to prevent the blades from having roots which can be directly supported by a hollow drum; but in cases in which higher linear blade speeds are involved that arrangement is not satisfactory.

The rotor of the invention comprises a drum on which are mounted, in driving connection therewith, pairs of conically-shaped or like discs (each pair supporting the blades of one row) which are concave to one another, all the discs being axially located on the drum.

According to a further feature of the invention, a rotor comprises a cylindrical drum on which are shrunk, or similarly mounted, pairs of frusto-conical steel discs (each pair having the blades of one row secured to the outer peripheries of the discs) which are concave to one another, and the discs are axially located on the drum and have intermeshing driving dogs, one disc at least having driving dogs which intermesh with driving dogs fast with the drum.

Preferably the discs are of high-tensile steel and the drum is of a steel having a high thermal expansion characteristic, the materials being selected so that the radial fit will be maintained between the discs and the drum in working conditions—that is to say, the radial expansion of the discs under centrifugal action at high speeds will substantially equal the radial expansion of the drum at the high temperatures which must be expected to be reached in such conditions. Expressed another way, the discs are secured on the drum so that the residual hoop stress in the discs (due to the interference fit) will be a minimum when working conditions have been reached.

Conveniently, the peripheries of each pair of discs are slotted or spaced axially from one another to receive the roots of the blades, the latter being riveted to the discs.

Axial location may be provided by means of hub portions formed integrally with the discs, the hub portions also providing the intermeshing dogs.

In the accompanying drawings:

Figure 1 is a fragmentary longitudinal section through the rotor, of a compressor of the axial flow type, arranged according to the invention; and Figure 2 is a fragmentary axial view of the blades in the highest pressure row, the adjacent disc being omitted and the rivets being shown in section.

The drawings show part of a hollow cylindrical drum 11 which is journalled for rotation in any convenient manner, and on its periphery are mounted a number of pairs of discs 12a, 12b, each pair jointly supporting a row of blades 13, 13, the highest pressure row being marked 13c. Each blade has a root 14 which is secured as by rivets 15, 15 between the outer edges of a pair of the discs 12a, 12b.

It will be observed that the discs of each pair are of frusto-conical shape and arranged concavely towards one another. Each is formed with a hub portion 16 fitted upon the external periphery of the drum 11. As stated the fit should be such that the residual hoop stress in the discs (due to the interference fit) is a minimum when working conditions are reached, the discs being of high-tensile steel and the drum 11 of a steel having a high thermal expansion characteristic.

In the present instance the disc 12a at the low pressure end (i. e., on the right of Figure 1) has its hub 16 axially located by means of a plate 17 secured as by a screw 18 to the adjacent end of the drum. Each of the disc hubs 16 is formed with a ring of dogs 19 which intermesh with the dogs 20 of the next adjacent disc hub for driving purposes. The disc 12b of the highest pressure blade row has its hub 16 formed with dogs 19 which intermesh with dogs 21 on a disc 22 secured as by means of a screw 23 to the adjacent end of the rotor. The disc 22 completes the endwise location of the discs.

If desired the spaces between adjacent blade rows may be filled in by means of flanged rings 25.

Another feature of the conical construction is that it provides axial rigidity. If a single disc were used, of a thickness which is capable of carrying the centrifugal loads, it would have no axial rigidity and would be prone to vibrate; it would also be incapable of withstanding the unbalanced gas or air pressures which exert on it an axial load.

The discs are made from S.11 steel which is the British Standards Institution specification for 55-65 ton nickel chromium steel for aircraft purposes. The chemical composition of this steel includes the following:

Carbon—not less than 0.25 nor more than 0.35 per cent.
Silicon—not more than 0.30 per cent.
Manganese—not less than 0.45 nor more than 0.70 per cent.
Sulphur—not more than 0.05 per cent.
Phosphorus—not more than 0.05 per cent.
Nickel—not less than 2.75 nor more than 3.75 per cent.
Chromium—not less than 0.50 nor more than 1.00 per cent.

The drum is made from DTD.176A steel which is an Air Ministry specification of a chromium-nickel non-corrodible steel. The chemical composition of this steel includes the following:

Carbon—not more than 0.20 per cent.
Silicon—not less than 0.20 per cent.
Manganese—not more than 1.00 per cent.
Sulphur—not more than 0.05 per cent.
Phosphorus—not more than 0.05 per cent.
Nickel—not less than 6.0 nor more than 20.0 per cent.
Chromium—not less than 12.0 per cent.

What we claim as our invention and desire to secure by Letters Patent of the United States is:

1. In combination, a cylindrical steel drum, pairs of frusto-conical steel discs having hubs shrunk on to and axially located on said drum, and circumferential rows of blades respectively secured to the outer peripheries of each pair of discs, each pair of said frusto-conical discs being arranged axially with one another with the conical surfaces of adjacent discs being concave to one another and all the hubs having intermeshing driving dogs, at least one of the hubs having driving dogs which mesh with driving dogs on said drum.

2. The combination of claim 1, characterised in that said discs are of high-tensile steel and that said drum is of a steel having a high thermal expansion, so that a radial fit between the hubs and drum will be maintained in working conditions.

3. A rotor carrying a number of circumferential blade rows, and intended to operate at a relatively very high speed, comprising a drum, pairs of conical-like discs having hub portions, said hub portions being shrunk on said drum and being axially located against one another in abutting relationship, the discs of each pair being arranged to be concave to one another, and blade rows respectively supported by each disc pair, driving means between said discs connecting adjacent pairs of discs for unitary rotation and means for securing at least one pair of discs to said drum for imparting rotation thereto from all of said discs.

THOMAS CLARK.
JOHN HARRY CLAPHAM ATKINS.

REFERENCES CITED

The following references are of record in the file of this patent:

UNITED STATES PATENTS

| Number | Name | Date |
|---|---|---|
| 770,207 | Wilkinson | Sept. 13, 1904 |
| 784,371 | Zoelly | Mar. 7, 1905 |
| 910,311 | Pratt | Jan. 19, 1909 |
| 2,058,479 | Lysholm | Oct. 27, 1936 |
| 2,356,605 | Meininghaus | Aug. 22, 1944 |

FOREIGN PATENTS

| Number | Country | Date |
|---|---|---|
| 74,422 | Austria | July 10, 1918 |
| 492,252 | Germany | Feb. 20, 1930 |
| 873,700 | France | Apr. 7, 1942 |